3,692,521
PANCHROMATIC RASTER PLATE FOR
ELECTROPHOTOGRAPHIC USE
Walther von Grable, Konigstein, Germany, assignor to
A. N. Zimmerman & Co., Neuss, Germany
No Drawing. Filed Oct. 21, 1970, Ser. No. 82,858
Int. Cl. G03g 5/02
U.S. Cl. 96—1.5      3 Claims

ABSTRACT OF THE DISCLOSURE

A new plate coating and structure for photographic use. The coating comprises a mixture of hexagonal selenium in a matrix of amorphous selenium with the distribution of the hexagonal component controlled to achieve panchromatic sensitivity to illumination through the visible spectrum and greatly improved tonal rendition of large dark areas. Methods for forming the matrix are also disclosed.

BACKGROUND OF THE INVENTION

The field of the invention is generally related to electrophotographic plates and more particularly to improvements in those plates which result in both broader spectral sensitivity and the elimination of edge effects in the reproduction of relatively large dark areas.

In the branch of electrophotography commonly known as xerography, an electrostatic image is formed by first charging and then exposing a photoconductive insulating surface to a light pattern, following which development and fixing occur. The photoconductive insulating surface is either reusable as in the process type where the developed image is transferred to a paper print material or not reusable as in the type of process where the print paper itself has a photoconductive insulating surface on which the image is initially formed. The reusable surface system has many advantages where substantial quantities of prints are desired since plain untreated print paper can then be used. It is toward improvement of the reusable surface type of system that the invention is directed.

The principal useful material for the photoconductive insulating material in the reusable plate type of xerography, is selenium. As is well-known, selenium is allotropic, occuring in three different forms: amorphous or viterous selenium, red crystalline or monoclinic selenium, and gray metallic or hexagonal selenium. The use of vapor deposited high purity selenium layers for xerographic purposes is well-known. One of the earliest of those references is Demeulenare who proposed it in 1932 in Belgian Pat. No. 389,155 without, however, any detailed description of the form of high purity selenium used. According to Chester F. Carlson in United States Pat. No. 2,297,691, the hexagonal or metallic form of selenium is not useful for xerographic purposes because of its low dark resistance. Thus, there remains only two forms of selenium which may prove useful.

A xerographic use of red crystalline selenium is described in the United States Pat. No. 2,862,817, of C. Meyer and P. Andrus. As there described the resultant plate has good red sensitivity but, has very low stability and plate production is possible only with great difficulty. Plates of this material have practically nil sensitivity to the blue range of visible light.

The xerographic use of amorphous selenium is described in German Pat. No. 813,089, assigned to the Battelle Memorial Institute. However, this material is limited in its spectral response to the ultraviolet range up to about 450 millimicrons. To overcome these spectral range limitations of the prior art, a modification of the coating has been disclosed by Paul H. Keck in the Journal of the Optical Society of America (April 1952, pp. 221 ff). The Keck material has an increased sensitivity in the red range over that of amorphous selenium. As described, the increased red sensitivity is achieved by controlling the temperature of the plate during the vacuum vaporization of the selenium to between 60° and 90° C. and by adding small amounts of Tellurium to the selenium. This practice results in the formation of nuclei of hexagonal or metallic selenium which themselves have increased red sensitivity. Unfortunately, however, the fatigue characteristics of this material are so low they cannot be used in commercial reusable plate xerographic systems.

In addition to the above noted limitations on selenium in xerography, unless special development electrode techniques are used, all three of these varieties of selenium coated drums are limited in their rendition of large dark areas due to "edge effects." These edge effects are due to the formation of sharp electrostatic contrasts at the edges of the large dark areas which tend to attract the developing particles.

BRIEF SUMMARY OF THE INVENTION

It is accordingly a principal object of the invention to provide improved xerographic plates of extended spectral sensitivity.

Yet another object of the invention is to provide improved xerographic plates with extended spectral sensitivity and which have high resistance to fatigue.

Still another object of the invention is to provide improved xerographic plates having improved rendition of large dark areas.

The foregoing and other objects are achieved in the xerographic plates and drums of the invention wherein an amorphous selenium of high spectral purity applied to a conductive carrier layer such as an aluminum drum is modified by localized spot heating to form a raster while the carrier layer is maintained at a temperature of —40° C. or colder.

DESCRIPTION OF THE PREFERRED EMBODIMENT

The general method of achieving vapor deposition of amorphous selenium on a conducting substrate or carrier is well-known and, in general terms, forms no part of the present invention. The amorphous selenium is deposited on the carrier under high vacuum conditions until a thickness of between about 60 to 80 microns is achieved. The deposition is accomplished while the carrier is maintained at a temperature between approximately room temperature and a maximum of about 90° C. Deposition takes place at a rate of between 0.1 and 10 microns per minute, the higher the temperature of the carrier, the higher the deposition rate.

After this initial conventional process step, it is a feature of the invention that the aluminum drum or carrier with its amorphous selenium layer or coating, is processed further to arrive at the inventive structure. The drum with its carrier layer is placed in a vacuum chamber and cooled to a temperature of at least —40° C. and preferably even colder to a temperature of —80° C. or more. While the drum is being cooled, the chamber is evacuated.

After cooling is completed and the chamber evacuated, the plate or drum is set in motion to assist in its being scanned raster fashion by an electron beam. The scanning beam is focused to a point and intensity modulated to effect at least superficial melting of the selenium coating. This superficial melting and subsequent immediate hardening results in a structure which at least approximates the hexagonal or metallic form. That this is true has been determined and proved by diffraction photographs using an electron microscope. The same determination and proof can be made with an ordinary microscope using circularly polarized light.

The plates or drums produced following this method having an increased sensitivity in the entire range of visible light. This is believed to occur because the final structure consists of considerable quantities of quasihexagonal or hexagonal selenium nuclei or islands embedded in amorphous selenium. Accordingly, the hexagonal selenium is sensitive in the spectral region extending from about 450 millimicrons toward the longer wavelengths while the amorphous selenium is sensitive from 450 millimicrons on toward the shorter wavelength spectrum.

The carrier/selenium structure achieved by the foregoing process has improved spectral response over that of the prior art and simultaneously achieves both high fatigue resistance, at least equal to that of the prior art, while simultaneously achieving improved rendition of the large dark areas through the reduction of the edge effects. The elimination of edge effects is still further improved in another embodiment of the invention wherein the scanning electron beam intensity is subject to a programmed Z axis modulation to enhance the tendency of the hexagonal materials to clump or form islands isolated from each other by the amorphous selenium which surrounds them. Since the selenium coating is easily able to achieve 200 metallic nuclei or islands per inch, tthe programmed modulation is adjusted to achieve this level taking into account relative scan velocity of the beam upon the coated plate. I have found that the useful range of such islands is from about 50 to about 1000 islands per inch. At less than about 50, loss of both image quality (definition) and panchromatic attributes begin to occur. Above about 1000 islands per inch, the size of the islands becomes so small that loss of panchromatic sensitivity again begins to occur. When this process step is incorporated in manufacture of the plates, the completed plate is far more insensitive to large dark areas with the final print exhibiting substantially uniform color across the dark area.

In yet another invention embodiment, the carrier drum together with its layer comprising a mixture of amorphous and hexagonal selenium, is subjected to the deposition of an overlayer of amorphous selenium whose thickness varies between 0.5 to about 30 microns, depending on the thickness of the underlayer. This overlayer further improves the fatigue life of the drum. Both spectral response and fatigue life are still further improved over the structure without an overlayer when the overlayer is comprised of tellurium doped amorphous selenium in a range of between 1% and 5%. When the overlayer consists of tellurium doped selenium, it has been found that the preferable thickness is between 0.5 and 1 micron.

While preferred embodiments employ tellurium doping of an overlayer, improved spectral response has also been achieved with very thin overlayers of selenium doped with small percentages of either thallium, chlorine compounds or chlorine. It is accordingly not the intent to limit the doping material of the overlayer to tellurium alone but rather, to a material which when formed enhances the spectral response of the entire carrier plate by providing relatively isolated nuclei or islands of hexagonal selenium surrounded by amorphous selenium.

The invention has been described in detail herein with particular reference to preferred embodiments thereof. However, it will be understood that variations and modifications can be effected within the spirit and scope of the invention as described hereinabove and as defined in the appended claims.

I claim:

1. A manufacturing process for achieving panchromatic sensitivity in a xerographic type plate comprising the steps of:

vacuum deposition of a coating of amorphous selenium upon a conducting plate to a thickness of between 60 and 80 microns while said substrate is maintained at a temperature between room ambient and 90° C., cooling said coated conducting plate to —40° C. or colder while subjecting it to a vacuum, and raster scanning the coated surface of said cooled plate with an electron beam that is intensity controlled to effect superficial melting and subsequent immediate hardening of said coating to thereby form hexagonal selenium islands.

2. The manufacturing process for a xerographic plate in accordance with claim 1 wherein the step of raster scanning is accomplished while the electron beam is program modulated to achieve 50–1000 islands per inch.

3. The manufacturing process for a xerographic plate in accordance with claim 1 comprising the additional step of vacuum depositing an overlayer of amorphorus selenium doped with between 1% to 5% tellurium.

References Cited

UNITED STATES PATENTS

| | | | |
|---|---|---|---|
| 2,739,079 | 3/1956 | Keck | 117—34 |
| 2,862,817 | 12/1958 | Meyer et al. | 96—1 |
| 2,962,376 | 11/1960 | Schaffert | 96—1 |
| 3,005,707 | 10/1961 | Kallmen et al. | 96—1 |
| 3,170,790 | 2/1965 | Clark | 96—1 |

JOHN C. COOPER, Primary Examiner

U.S. Cl. X.R.

117—34, 93.3, 129, 201; 252—501